July 14, 1925.

W. J. NOWAK

ARTIFICIAL FISH LURE

Filed April 9, 1923

INVENTOR.
Walter J. Nowak
BY Ralzemond A. Parker
ATTORNEY.

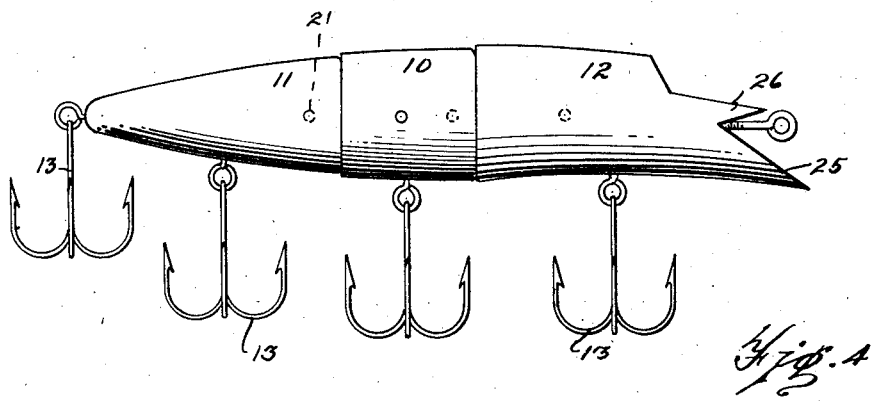
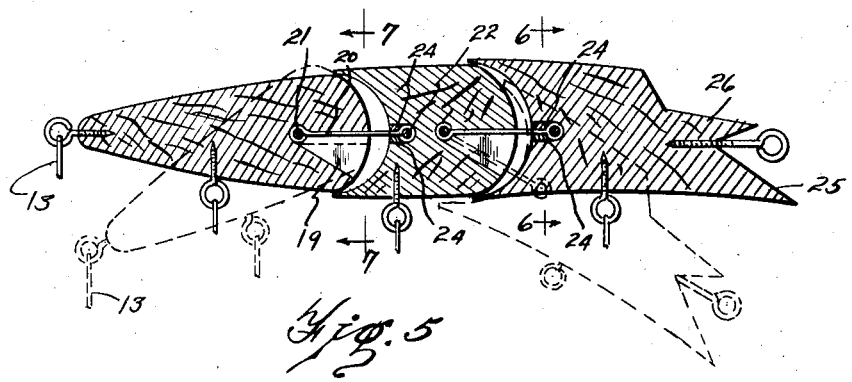
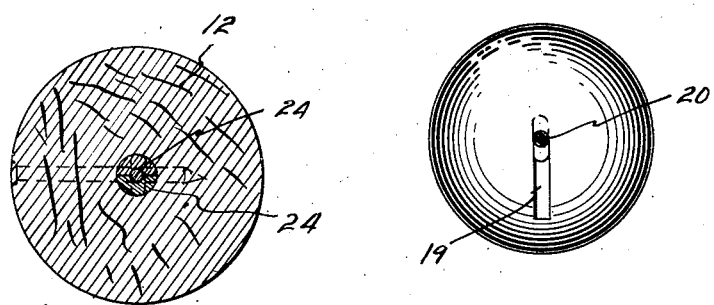

Patented July 14, 1925.

1,545,683

UNITED STATES PATENT OFFICE.

WALTER J. NOWAK, OF DETROIT, MICHIGAN, ASSIGNOR OF ONE-HALF TO RAYMOND R. NOWAK, OF DETROIT, MICHIGAN.

ARTIFICIAL FISH LURE.

Application filed April 9, 1923. Serial No. 630,715.

*To all whom it may concern:*

Be it known that I, WALTER J. NOWAK, a citizen of the United States, residing at Detroit, county of Wayne, State of Michigan, have invented a certain new and useful Improvement in Artificial Fish Lure, and declare the following to be a full, clear, and exact description of the same, such as will enable others skilled in the art to which it pertains to make and use the same, reference being had to the accompanying drawings, which form a part of this specification.

My invention relates to an improved artificial fish bait and to that class of artificial bait adapted for trolling or to be otherwise dragged through the water as a lure to attract fish.

It is illustrated as specifically embodied in a bore shaped to represent a minnow though it might take another shape and embody the features of my invention.

The object is to provide an attractive fish lure composed of body sections provided with suitably disposed hooks, which sections are articulated so as to impart a wiggling movement to the lure when dragged through the water, and the construction and articulation is such that when the lure is struck by a fish it will break downwardly and the hooks carried by the separate sections may grab into the fish, and an important feature is the provision of articulating connections between the body sections and the shaping of the meeting ends of the sections so as to facilitate this downward breaking of the lure.

Another important feature is to provide an articulated fish lure having a lateral wiggling movement when drawn through the water and adapted to break downwardly when struck by a fish, which lure is so shaped at the forward end as to dip and rise when in motion, thereby more nearly simulating the movement of live bait.

I have shown two specific embodiments of my invention in the drawing, illustrative of suitable connections and articulated body portions adapted to perform the desirable functions of my improved fish bait, as will more fully appear from the following description, appended claims and accompanying drawings, in which:

Fig. 4 is a side elevation of a modified form of my invention.

Fig. 5 is a longitudinal sectional view through Fig. 4.

Fig. 6 is a cross-sectional view taken on the line 6—6 of Fig. 5.

Fig. 7 is a cross-sectional view taken on the line 7—7 of Fig. 5.

I have illustrated my invention in two specific embodiments comprising articulated body structures shaped to represent a minnow, the separate sections of the body structure being so formed and articulated together as to cause the body to break down in one direction only when struck by a fish. Each of the body sections is preferably provided with one or more hooks which may engage the fish.

Artificial fish bait consisting of articulated body sections is not broadly novel, but an important feature of my improved bait is to so construct and arrange the articulated connections that the bait will break downwardly when struck by a fish. Bait of this character is drawn through the water in such a manner that it is struck from underneath by a fish and if the articulation between the body sections is such that the sections can move upwardly or laterally as well as downwardly in the breaking of the body, the hooks carried by the particular sections not struck by the fish serve no purpose. My body construction is such that when the bait is struck the body breaks down so that the hooks carried by the sections other than the one directly struck by the fish will also engage the fish.

Figure 1:
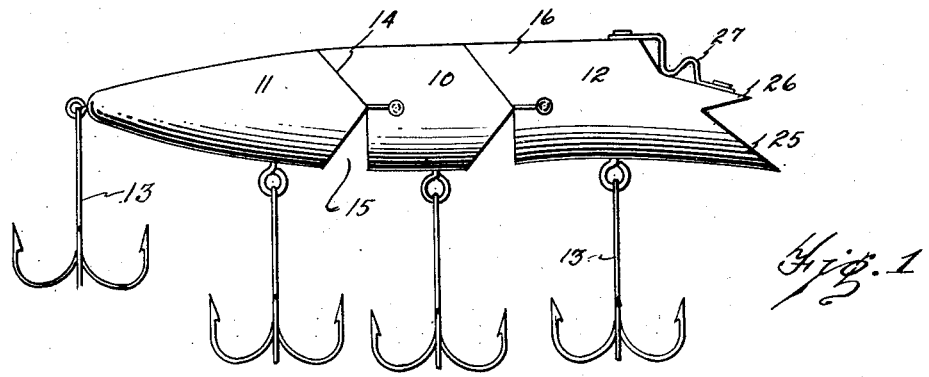
Figure 1 is a side elevation of a preferred form of one specific embodiment of my invention.
Figure 2:
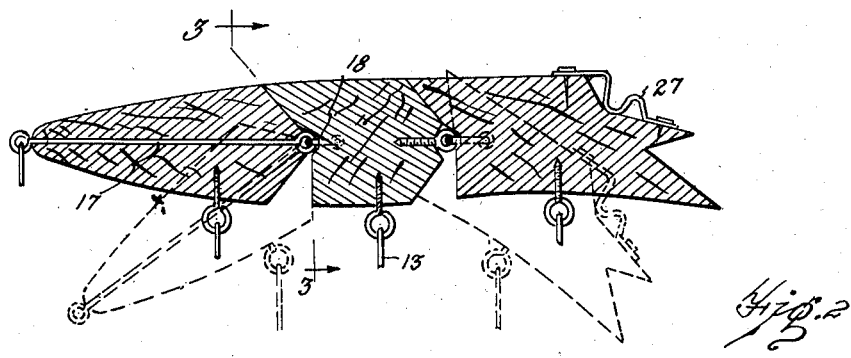
Fig. 2 is a longitudinal sectional view through Fig. 1.
Figure 3:
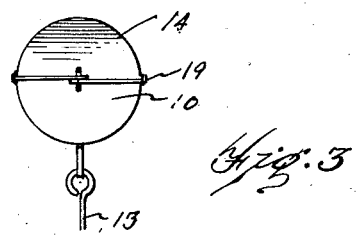
Fig. 3 is a cross-sectional view taken on the line 3—3 of Fig. 2.

In the specific embodiment illustrated in Figs. 1 to 3, I have shown an intermediate body section 10, to the rear end of which is attached a tail section 11 and to the forward end of which is connected a head section 12.

Each of these sections carries hooks 13 loosely attached thereto. The tail section slopes rearwardly on each side from its connection and the intermediate section is provided with an overhanging portion as at 14 to engage the rearwardly sloping adjacent portion of the tail section, as shown in Figs. 1 and 2, to prevent vertical movement upwardly of the tail section relative the intermediate section. The intermediate section below the connection is cut away to provide clearance as at 15 between the intermediate section and the tail section below the connection. The head section 12 is provided with an overhanging portion 16 corresponding to the overhanging portion 14 of the intermediate section, which overhanging portion 16 engages the rearwardly sloping face of the intermediate section. The head section is formed below the connection similar to the intermediate section previously described so that the entire body may break downwardly as shown in Fig. 2 but cannot break upwardly. To engage the separate sections together I have provided eye-bolts 17 which are embedded in two of the sections and engage links 18 held to the co-operating sections by means of pins 19 to permit relative movement of the sections described herein.

In the construction illustrated in Figs. 4 to 7 inclusive one section at each joint is convex and the cooperating section at the joint is concave. One section at each joint is also cut away to provide an angular recess as at 19 and a connecting link 20 is pivoted at 21 to the innermost extremity of said recess and extends through to be engaged by means of a pin 22 to the co-operating section. Wedges 24 hold this link rigidly within the one section while permitting free play within the slotted section. It will be seen, therefore, that when this body member is struck from underneath the only way in which it can break is downwardly, the links traveling through the recesses 19.

The head portion 12 of each specific embodiment is provided with a lower rearwardly sloping lip 25 above which is positioned the forwardly projecting lip 26. In the construction shown in Fig. 1, I provide a connection 27 for a line which connection comprises a plurality of loops disposed one above the other so as to permit the line to be engaged with the lure at different positions vertically relative the body of the lure to cause the lure to travel at different depths in the water when drawn therethrough. The plurality of overhanging lips at the forward end of the head section causes the lure to rise and dip vertically as it is drawn through the water and adds to the effect of simulating live bait.

What I claim is:

1. An artificial fish lure consisting of a plurality of body sections articulated with each other and so shaped at their jointed ends that the lure can break down in one direction only.

2. An artificial fish lure, the body portion of which is composed of an intermediate body section to one end of which is articulated a tail section and to the opposite end of which is articulated a head section, such sections so shaped at their articulated ends and so articulated as to break down in one direction only.

3. An artificial fish lure, the body portion of which is composed of an intermediate body section to one end of which is articulated a tail section and to the opposite end of which is articulated a head section, the meeting ends of which articulated sections are cut away on one side of the joint to break in such direction and closely abut each other on the opposite side to prevent breaking in the opposite direction.

4. An artificial fish lure consisting of a plurality of body sections articulated with each other, the meeting end of one section at the joint sloping away from the connection, the meeting end of the other section at the joint overhanging the connection on one side to engage the sloping face of the first section and cut away on the opposite side to provide a clearance between the two sections to cause the body to break down in the direction of the cut-out.

5. An artificial fish lure, the body portion of which is composed of an intermediate body section to one end of which is articulated a tail section and to the opposite end of which is articulated a head section, said sections so articulated as to break down in one direction only, the head section so shaped at the forward end as to provide a pair of rearwardly sloping lips one overhanging the other.

6. An artificial fish lure, the body portion of which is composed of an intermediate body section to one end of which is articulated a tail section and to the opposite end of which is articulated a head section, said sections so articulated with each other as to break downwardly when struck by a fish, the head section so shaped at the forward end as to provide a plurality of rearwardly sloping lips one of which overhangs the other and to the surface of which upper lip is secured a line connection.

In testimony whereof, I sign this specification.

WALTER J. NOWAK.